United States Patent [19]
McGrath

[11] Patent Number: 5,464,498
[45] Date of Patent: Nov. 7, 1995

[54] FLEXURAL SPRING SUPPORT FOR VIBRATORY APPARATUS

[75] Inventor: Philip E. McGrath, Victor, N.Y.

[73] Assignee: Branson Ultrasonics Corporation, Danbury, Conn.

[21] Appl. No.: 292,938

[22] Filed: Aug. 18, 1994

[51] Int. Cl.[6] .................................................. B29C 65/06
[52] U.S. Cl. ..................... 156/580.2; 156/73.5; 156/580
[58] Field of Search ................................ 156/73.1, 570.1, 156/580.2, 23.5, 580; 425/174.2; 264/23

[56] References Cited

U.S. PATENT DOCUMENTS

| | | | |
|---|---|---|---|
| 3,920,504 | 10/1974 | Shoh | 156/580.1 |
| 4,349,931 | 9/1982 | Leon | 10/123 P |
| 4,853,053 | 8/1989 | Minjolle et al. | 156/73.5 |
| 5,160,393 | 11/1992 | Snyder | 156/73.5 |

*Primary Examiner*—David A. Simmons
*Assistant Examiner*—J. Sells
*Attorney, Agent, or Firm*—Polster, Lieder, Woodruff & Lucchesi

[57] ABSTRACT

A flexural spring support for a vibratory apparatus comprises a unitary metal body which includes a substantially stationary member, an oppositely disposed spaced member intended to move in a plane, and a plurality of flexural spring beams coupling the members to one another. Each flexural spring beam is constructed as a substantially constant strain tapered beam.

8 Claims, 1 Drawing Sheet

FLEXURAL SPRING SUPPORT FOR VIBRATORY APPARATUS

BRIEF SUMMARY

This invention generally relates to vibratory apparatus and is of particular use in connection with friction or vibration welding apparatus used for welding workpieces, particularly thermoplastic parts, to one another along a common interface surface responsive to generating frictional heat at such surface. More specifically, this invention concerns an improved flexural spring support for use in a vibration device, such as a welding apparatus, wherein a member, for instance a plate coupled to one of the parts to be welded, undergoes translating motion in a plane for generating frictional heat at the common interface surface between the parts. The vibration may be a reciprocating translating motion, elliptical motion, orbital motion or a similar translating motion, all such motions occurring within a plane which can be identified as the motion plane.

Friction or vibration welding apparatus for the purpose stated above are well known in the art, see for instance, U.S. Pat. No. 3,920,504 issued to A. Shoh et al, dated Nov. 18, 1975, showing an electromagnetically actuated welding apparatus providing reciprocating translating motion, or U.S. Pat. No. 5,160,393 issued to E. A. Snyder, dated Nov. 3, 1992, showing a similar apparatus providing orbital motion.

In an apparatus of this type, a support is required which couples the member subjected to motion to a stationary frame and such support generally includes a plurality of flexural springs which suspend the movable member, yet permit such member to be displaced while retaining the member in the motion plane during its motion. The construction and attachment of these springs present unique problems in that either the springs are not properly configured for long life, or the attachment of the springs is such that fretting corrosion and metal fatigue occur, causing a very short life of operation of the apparatus with the attendant interruption of production.

In order to overcome these problems, the present invention discloses a flexural spring support in which the movable member, the substantially stationary member and the plurality of flexural springs are fabricated as a unitary body. Hence, the attachment of the springs is eliminated. In addition, each of the springs is shaped to form a clamped clamped substantially constant strain tapered beam, which term will be defined later, thereby eliminating breakage as the strain is selected to be below the maximum allowable design stress applicable to the particular material. This feature immeasurably enhances the performance and reliability of the springs and thereby that of the apparatus of which the flexible spring support forms a part.

A principal object of this invention, therefore, is the provision of a new and improved flexural spring support.

Another important object of this invention is the provision of a new and improved flexural spring support, particularly useful in connection with friction or vibration welding apparatus.

A further important object of this invention is the provision of a flexural spring support for a vibratory apparatus overcoming the problems inherent in connection with securing the ends of flexural springs to respective members.

Another and further object of this invention is the provision of a flexural spring support in which fretting corrosion of individual flexure springs is eliminated.

Still another and further object of this invention is the provision of a flexural spring support comprising a substantially stationary member, a member adapted to be driven in a motion plane, and a plurality of flexure springs coupling the members to one another forming a unitary body.

Further and still other objects of this invention will become more clearly apparent from the following description when taken in conjunction with the accompanying drawings.

DESCRIPTION OF THE INVENTION

Figure 1:
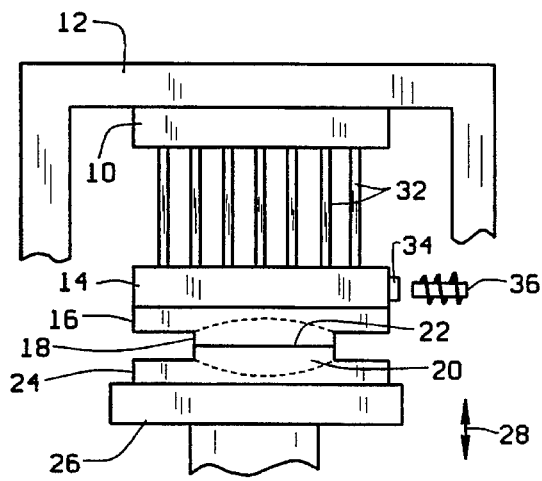
FIG. 1 is a schematic elevational view of a typical vibratory apparatus useful for friction welding.

Referring now to the figures and FIG. 1 in particular, numeral 10 designates a first metal member which is secured to a relatively massive frame structure 12. Disposed opposite and in spaced relation there is disposed a second metal member 14 which at its underside is provided with a fixture plate 16 for holding one part 18 of a workpiece to be welded to another part 20 of such workpiece along a common interface surface 22. The part 20 is held in a fixture plate 24 which is attached to a vertically movable table 26 as indicated by arrow 28 to provide an adjustable engagement force between the parts 18 and 20 for welding the parts to one another and also for providing an opening to enable the subsequent removal of the welded workpiece.

The second member 14 is suspended from the first member 10 by an array of spaced metal rods 32 which form flexural springs for enabling the member 14 to undergo translating motion in a plane, which is the motion plane, and which is parallel to the plane in which the interface surface 22 is disposed. When the member 14 is at rest, the axis of each of the springs is substantially perpendicular to the motion plane. Depending on the motive means acting upon the member 14, such as one or more pole pieces 34 and the corresponding placement of electromagnetic coils 36, the movable member 14 may undergo a translating reciprocating motion, an orbital motion, an elliptical motion, or similar motion in the motion plane. Such motion generates frictional heat at the interface surface 22 to cause, in the example of thermoplastic parts, plastic material to soften and to flow.

Figure 2:
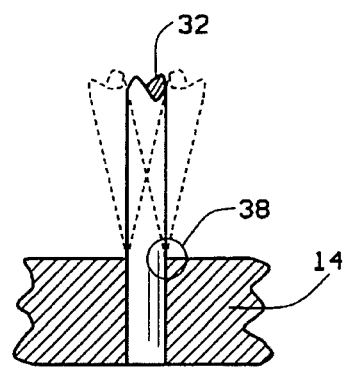
FIG. 2 is an elevational view, partly in section, illustrating the attachment of the flexural spring in the prior art construction.
Figure 3:
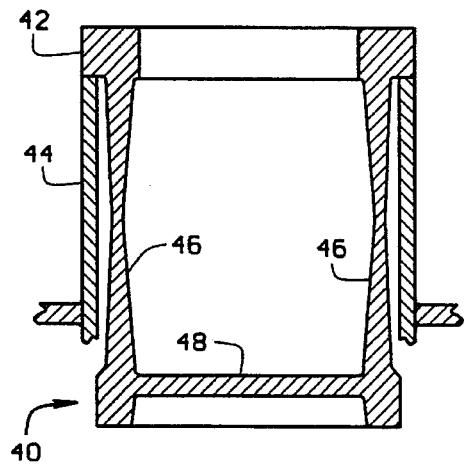
FIG. 3 is an elevational view, in section, of the improved flexural spring support for a vibratory apparatus.
Figure 5:
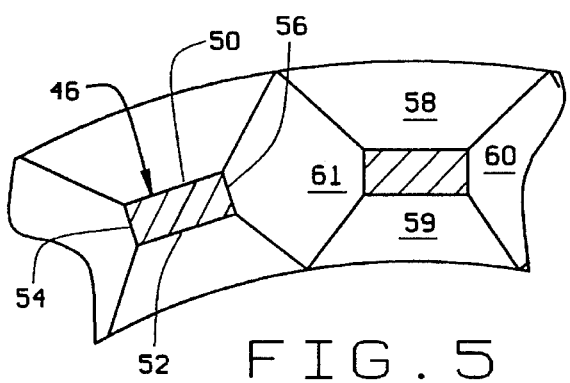
FIG. 5 is a plan view, partly in section, illustrating the merging surfaces between the flexural springs and the members to which the springs are coupled.
Figure 4:
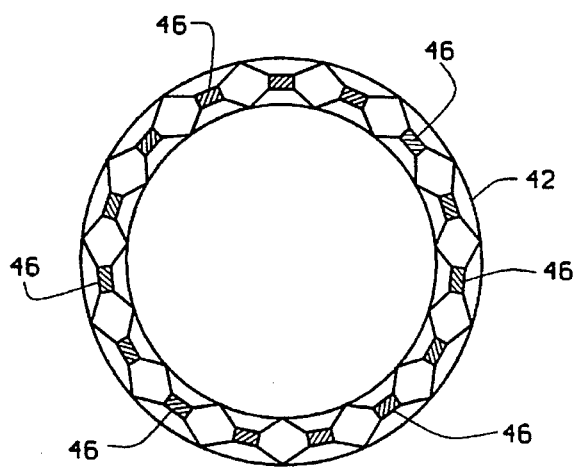
FIG. 4 is a plan view, partly in section, of the improved flexural spring support.
Figure 6:
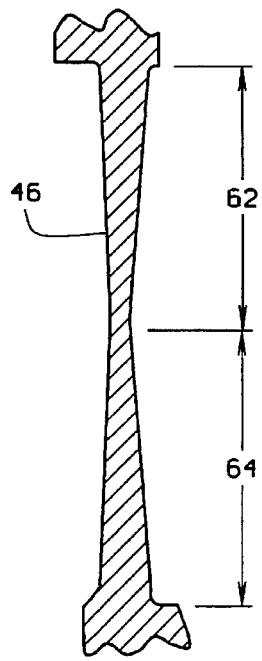
FIG. 6 is a sectional view of a single flexural spring forming an important part of the present invention.

Securing the ends of each rod 32 to the respective members 10 and 14 presents unusual problems. In a typical prior art arrangement, see Snyder supra, each end of a spring is secured to the respective member 10 and 14 by a press fit. It will be realized that members 10 and 14, responsive to motion of member 14 undergo opposite motion in parallel planes. The excursion of the members is inversely related to their effective masses and, in a typical example, the masses are selected to cause member 10 to undergo a motion which +is in the order of ten or fifteen per cent of that of the driven member 14. This smaller motion is readily isolated from the stationary frame by shock mounts, not shown, disposed in the frame structure. Typical motion occurs at a frequency in the range between 100 and 240 Hz. Using a press fit, the ends of the springs, during assembly, must be driven in unison into one member and then into the other member, requiring an enormous amount of pressure. In addition, referring to FIG. 2, the repetitive, high frequency flexing of each spring 32, indicated by dashed lines on a somewhat exaggerated scale, causes fretting corrosion of the springs in the region denoted by numeral 38. This fretting corrosion, occurring in the region of highest stress, is responsible for a rather short operating life of the vibratory apparatus with the consequent interruption of production.

An improved flexural spring support is disclosed in FIGS. 3 to 6. With reference to these figures, numeral 40 identifies the improved flexural spring support fabricated from a single body of metal. Thus, the first member 42, secured to a stationary frame structure 44, a plurality of flexural springs 46 and the second member, adapted to be subjected to motion in a motion plane, form a unitary structure. In the embodiment illustrated, the support is of a generally cylindrical shape wherein the first substantially stationary member 42 is an annular plate, the array of springs is disposed in a circle, and the member 48, adapted to undergo motion, is adapted also to support a suitable fixture which retains a part of a workpiece to be welded. It should clearly be understood that the spring support does not need to be of a cylindrical shape as shown, but that the spring support can be of rectangular or square shape, or other suitable configuration.

Each of the flexural springs coupled between the members 42 and 48, as a result of material removal and machining, exhibits four sides, namely an outer cylindrical curved side surface 50, an inner cylindrically curved side surface 52 and two substantially flat side surfaces 54 and 56.

In order to avoid any undue stress at the region where a flexural spring 46 merges into a respective plate member 42 or 48, each of the four side surfaces merges with a respective plate surface by respective transition surface 58, 59, 60 and 61, thus avoiding high stress points evident in the prior art.

Another important improvement of the present invention concerns the shape and construction of each flexural spring 46. Each spring is a double tapered beam, i.e. tapered from the end or base toward the middle, see numerals 62 and 64, and the beam is constructed to exhibit substantially constant strain. For the purpose of this specification and claims this beam design is termed "clamped clamped substantially constant strain tapered beam". The dimensioning of the beams is derived most suitably by finite element analysis, known to those skilled in the art. When designing the springs, the expected operational stress is kept below the maximum allowable design stress for the material selected and the parameters under which the springs are to operate. A suitable material is steel having a trade designation No. L6 or 6150. In a typical embodiment illustrated and intended for operation in the frequency range noted above, the overall height of the assembly is approximately 305 mm, the outer diameter about 254 mm, the length of each spring approximately 230 mm, and the quantity of the springs in a circle is 15. A typical motional excursion of the plate member 48 is 1.8 mm peak-to-peak at 240 Hz. These values are provided only as typical values and shall in no way be considered limitations.

It clearly will be evident that the improved flexural spring mount substantially overcomes the problem of fretting corrosion experienced heretofore in the region where the springs are secured to a respective plate member. Using the unitary construction and the curved transition surfaces revealed, regions of high stress are substantially eliminated. In addition, the construction of each spring in the form of a clamped clamped constant strain tapered beam must be considered as a significant feature in that reliability and service life is greatly improved. Actual life tests carried out have demonstrated the superiority of the flexural spring support revealed hereinabove over the prior art design.

While there has been described and illustrated a new and improved construction for a flexural spring support and certain alternative designs have been indicated, it will be apparent to those skilled in the art, that various further changes and modifications may be made without departing from the broad principle of this invention, which shall be limited only by the scope of the appended claims.

What is claimed is:

1. A flexural spring support for a vibratory apparatus comprising:

a first member adapted to be coupled to a stationary frame;

a second member disposed opposite and spaced from said first member and intended to undergo translating motion in a plane responsive to motive means acting upon said second member;

a plurality of spaced flexural springs coupling said first member to said second member, and said first member, second member and said flexural springs comprising a unitary body of metal.

2. A flexural spring support for a vibratory apparatus as set forth in claim 1, each of said springs, in the absence of motion of said second member, having an axis disposed substantially perpendicular to said plane.

3. A flexural spring support for a vibratory apparatus as set forth in claim 2, each of said springs comprising a clamped clamped substantially constant strain tapered beam.

4. A flexural spring support for a vibratory apparatus as set forth in claim 3, each of said beams having four side surfaces and each of said side surfaces merging with said first member and said second member with a curved transition surface to avoid high stress points.

5. A flexural spring support for a vibratory apparatus as set forth in claim 4, said beams being disposed in a circle.

6. A flexural spring support for a vibratory apparatus as set forth in claim 5, said four side surfaces including an outer cylindrically curved surface, an inner cylindrically curved surface, and two substantially flat surfaces.

7. A flexural spring support for a vibratory apparatus as set forth in claim 4, said first member comprising an annularly shaped plate and said second member comprising a plate.

8. A flexural spring support for a vibratory apparatus as set forth in claim 4, said second member being adapted to undergo said translating motion responsive to electromagnetic means acting upon said second member.

* * * * *